United States Patent [19]
Miller et al.

[11] Patent Number: 6,126,539
[45] Date of Patent: Oct. 3, 2000

[54] PILOT VALVE MOUNTING WHICH FUNCTIONS AS A HOT AIR DUCT

[75] Inventors: Andrew S. Miller, Sanford; John Robert Beaton, Apex, both of N.C.

[73] Assignee: Caterpillar S.A.R.L., Geneva, Switzerland

[21] Appl. No.: 09/164,707

[22] Filed: Oct. 1, 1998

[51] Int. Cl.[7] .................................................. B60H 1/00
[52] U.S. Cl. ........................ 454/144; 454/159; 454/152
[58] Field of Search .................................. 454/143, 144, 454/152, 155, 159

[56] References Cited

U.S. PATENT DOCUMENTS

| | | | |
|---|---|---|---|
| 1,892,201 | 12/1932 | Blackmer . | |
| 2,664,308 | 12/1953 | Appel . | |
| 3,448,674 | 6/1969 | Bouthors et al. ....................... | 454/143 |
| 3,919,926 | 11/1975 | Yamada ................................... | 454/144 |
| 4,026,349 | 5/1977 | Schaap . | |
| 4,189,987 | 2/1980 | Amberg et al. . | |
| 4,344,356 | 8/1982 | Casterton et al. . | |
| 4,512,239 | 4/1985 | Watanabe et al. ....................... | 454/144 |
| 4,531,453 | 7/1985 | Warman et al. . | |
| 5,052,283 | 10/1991 | Altus ........................................ | 454/144 |
| 5,308,279 | 5/1994 | Grinberg ................................. | 454/144 |
| 5,358,178 | 10/1994 | Crocker . | |

FOREIGN PATENT DOCUMENTS

| | | | |
|---|---|---|---|
| 1075524 | 4/1980 | Canada ................................... | 454/144 |

*Primary Examiner*—Harold Joyce
*Assistant Examiner*—Derek S. Boles
*Attorney, Agent, or Firm*—Hancock Estabrook, L.L.P.

[57] ABSTRACT

A pilot valve mounting system for lift arm control of a work machine having an operator's cab compartment includes a shroud for the pilot valve mounting. Utilizing the pilot valve mounting system as a hot air duct for bringing hot air to the machine operator's feet and the machine windshield reduces the need for additional components and maximizes usage of space within the operator's cab compartment. A cab heater motor/blower exhausts heated air into the pilot valve mounting shroud whereby the hot air is delivered through directionally movable louvered grills into the operator's cab compartment to direct the heated air where desired.

5 Claims, 2 Drawing Sheets

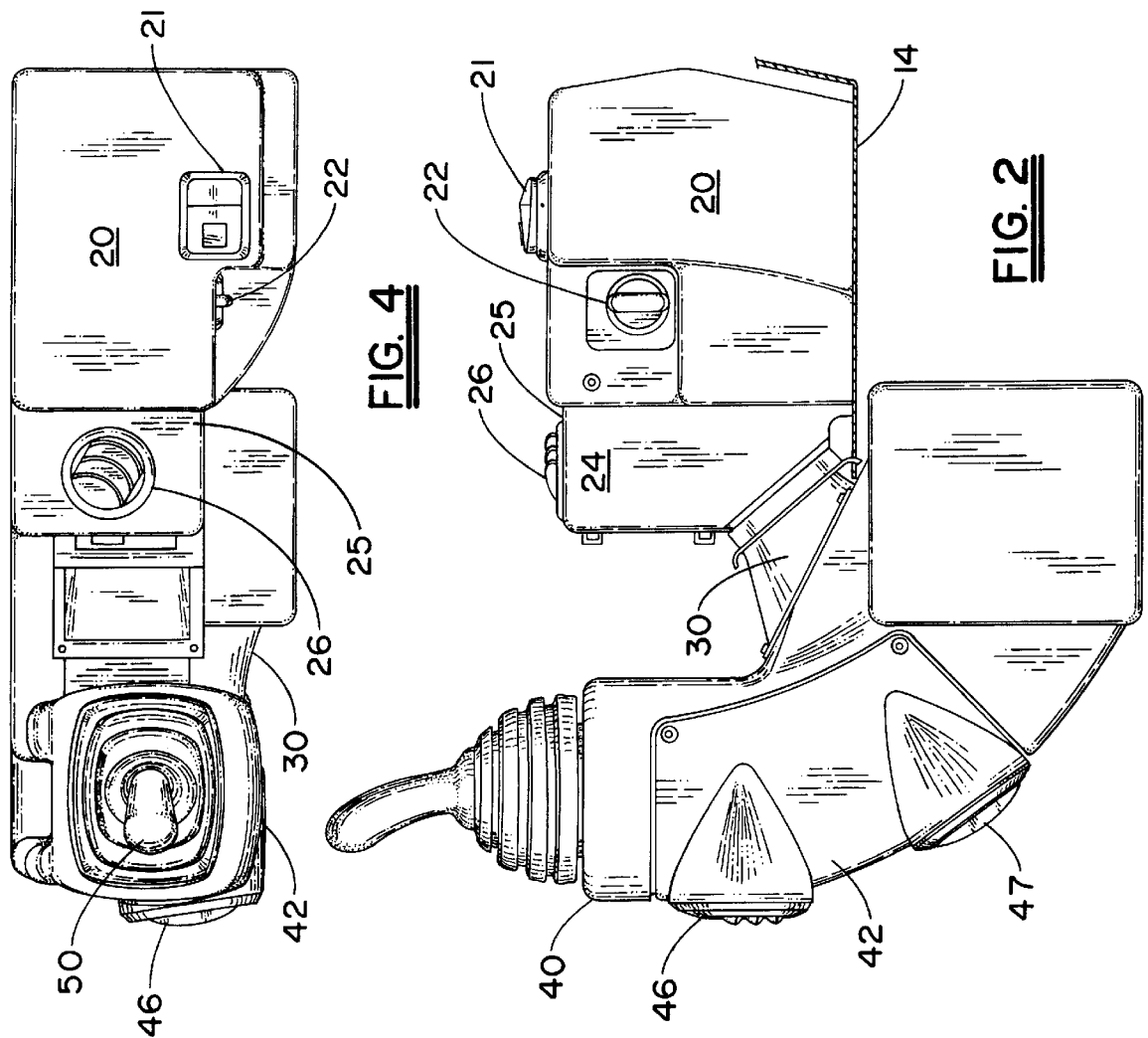
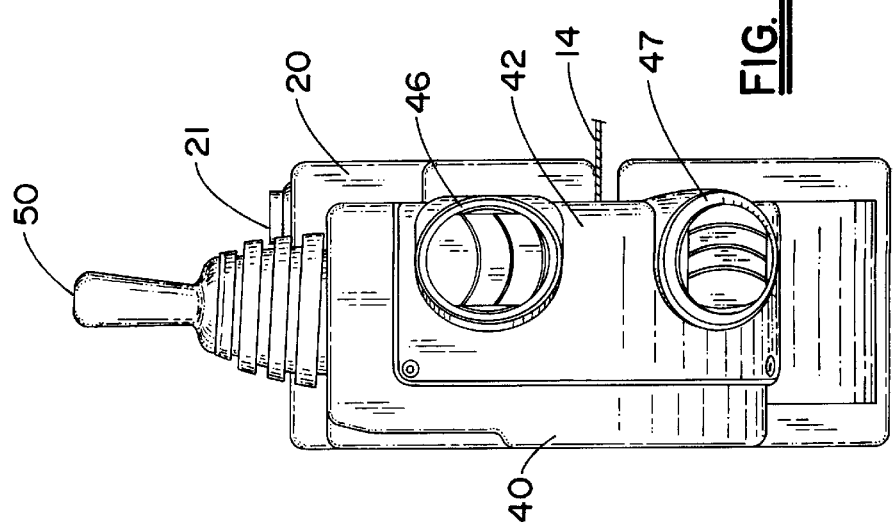

PILOT VALVE MOUNTING WHICH FUNCTIONS AS A HOT AIR DUCT

TECHNICAL FIELD

This invention relates generally to heating systems for an operator's cab compartment of a work machine and, more particularly, to an operator's cab compartment heating system which minimizes the requirements for system components and maximizes the utilization of space within the operator's cab compartment.

BACKGROUND ART

In the operation of work machines such as construction and industrial vehicles, control of the environment within the operator's cab compartment is desirable so that in inclement weather the operator can increase the temperature in the cab compartment, and direct the heating medium to those areas of the cab compartment where the operator desires, such as the operator's person or the vehicle windshield. The installation of such a heating system can be readily effected in large work machines or multi-passenger vehicles because space for the installation of heating system ductwork is freely available, and the components necessary for such a heating system can be readily installed without utilizing space required by the operator to control operation of the vehicle or the vehicle implements. However, installation of a suitable heating system in a compact work machine having very limited space in the operator's cockpit, must perform such a function within the limited space available and can not preempt the equipment necessary for machine operation.

For example, the vehicle temperature control systems disclosed in U.S. Pat. No. 4,189,987; U.S. Pat. No. 4,344,356 and U.S. Pat. No. 4,531,453 are all utilized in enclosed vehicle cabs wherein sufficient space is available so that the heating ductwork can be readily installed within the walls forming the cab enclosures without interfering with the operator's control of the vehicle or the operation of the vehicle implements. However, in a compact work machine such as a skidloader, the operator's cockpit is quite compact and can not utilize such systems as disclosed in these patents.

Similarly, there is disclosed in U.S. Pat. No. 2,664,308 a large multi-passenger vehicle wherein sufficient room exists within the engine compartment to install, adjacent to the vehicle engine, a heater core carried within a duct constructed upon a portion of the vehicle's structural frame members, to convey heat from the heater core to the passenger compartment.

In U.S. Pat. No. 5,358,178 there is disclosed an attempt to overcome the problems associated with providing a heating system within the limited space in the operator's cockpit of a compact work machine such as a skidloader. To this end, a shroud assembly is provided to fit over the vehicle's radiator and radiator fan. The shroud is coupled to the vehicle cab by means of an external conduit to convey heated air from the radiator into the vehicle cab.

The present invention is directed to overcome one or more of the problems as set forth above.

DISCLOSURE OF THE INVENTION

In the preferred embodiment of this invention the necessity of providing heated air distribution ductwork for distributing heated air to desired areas within the operator's cab of a compact work machine such as a skidloader is minimized or eliminated. A compact cab heater/blower is positioned to the side and rear adjacent to the operator's seat, and the heated air output therefrom is coupled substantially directly to a hollow protective shroud surrounding a pilot control valve housed therein, and through which operation of the machine is controlled by a machine operator utilizing a joystick controller. Directionally positionable louvers are carried by the protective shroud to selectively direct the heated air to desired areas within the operator's cab, such as impinging upon the machine operator and the machine windshield.

BRIEF DESCRIPTION OF THE DRAWINGS

In the accompanying drawings like reference numerals indicate corresponding parts throughout.

FIG. 2 is a side elevational view of the heating system of the present invention taken in the direction of the arrows 2—2 in FIG. 1 with portions of the work machine removed to better illustrate the components thereof;

FIG. 3 is a frontal elevational view of the heating system illustrated in FIG. 2; and FIG. 4 is a top elevational view of the heating system illustrated in FIG. 2.

BEST MODE FOR CARRYING OUT THE INVENTION

Figure 1:
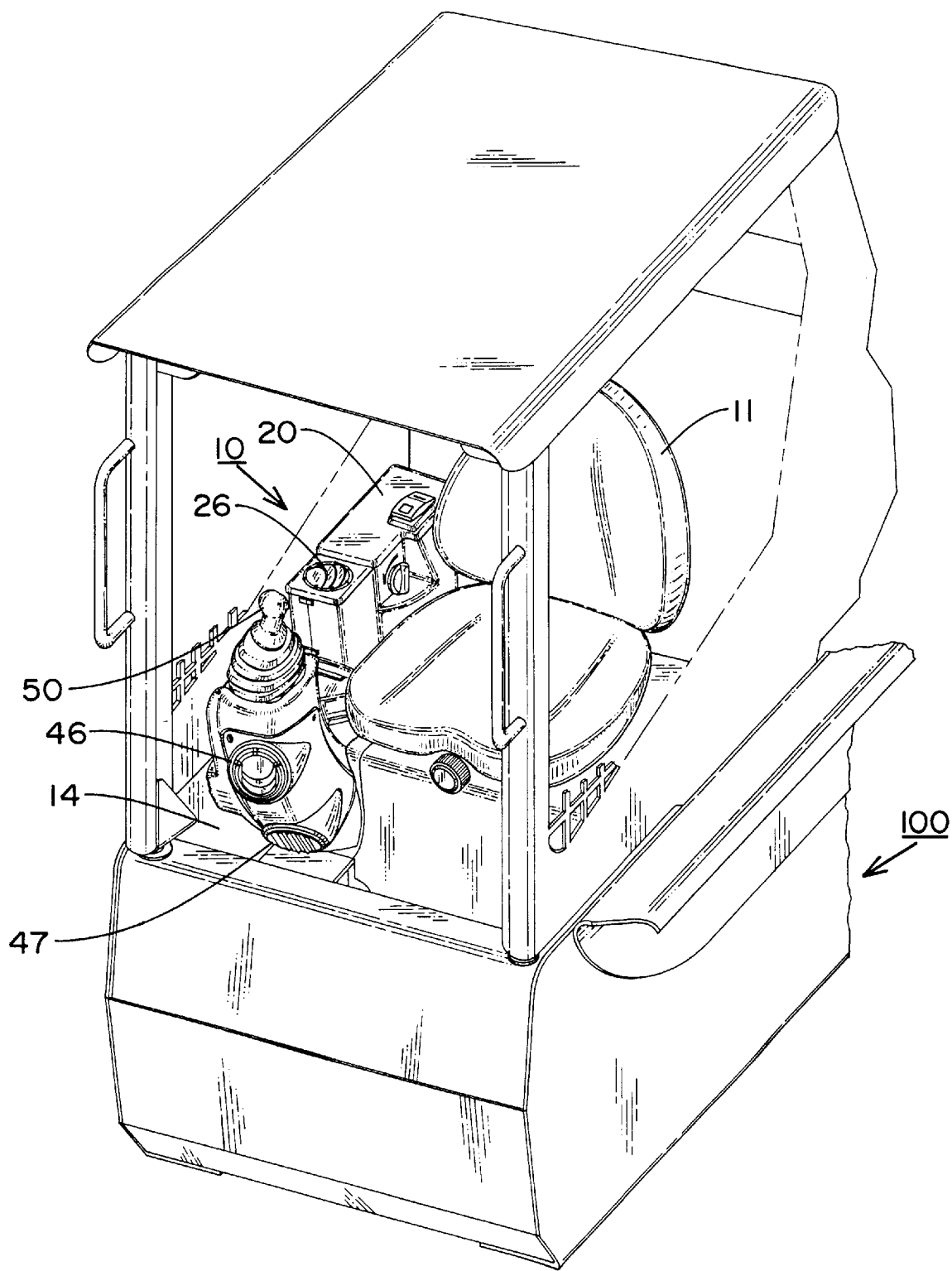
FIG. 1 is a frontal perspective view of a cab compartment of a work machine, such as a skidloader, with parts and portions removed to better illustrate the heating system of the present invention.

Referring now to the drawings and in particular to FIG. 1, there is diagrammatically illustrated the cab or operator's compartment 10 of a work machine such as a skidloader 100. The operator's compartment 10 includes a seat 11 in which the machine operator sits during operation of the machine.

A heater/blower unit 20 is secured to a portion of a floor 14 of the operator's cab 11 in a position adjacent to the side of and to the rear of the operator's seat 11. The heater/blower 20 includes an on-off switch 21 and a heat control knob 22 positioned within reach of the machine operator for, respectively, energizing the blower unit 20 and controlling the temperature of the air discharged therefrom. A plenum portion 24 of the heater/blower unit 20 is coupled substantially directly to a closed protective shroud 40 by a transition coupling 30. The shroud 40 encloses a pilot control valve (not shown), through which the machine operator controls the operation of the machine. In this manner heated air from the heater/blower unit 20 is discharged directly into the shroud 40, except for a portion of the heated air which is discharged through a directionally positionable louver 26 carried by a top wall 25 of the plenum, which preferably is positioned to direct heated air to the machine operator.

A joystick controller 50 extends upwardly and outwardly from the protective shroud 40 and is used by the machine operator to control the operation of the machine through actuation of the pilot control valve enclosed within the protective shroud 40. Because the protective shroud 40 is hollow inside, the heated air discharged thereinto can be directed therefrom as desired. Accordingly, a support or access plate 42, removably connected to the shroud 40 to provide access to the pilot control valve enclosed within the shroud, carries directionally positionable upper and lower louvers, 46 and 47 respectively, for directing the discharge of the heated air from the heater/blower into selected positions of the operator's cab. As best shown in FIGS. 2 and 3, the upper louver 46 is preferably positioned to direct heated air to the machine windshield and the lower louver 47 is positioned to direct heated air to the machine operator's feet.

While this invention is described and shown for use with a work machine such as a skidloader, it is to be understood that the invention could be adapted to function just as well on a larger machine having a protective shroud for machinery controls positioned adjacent to the machine operator, when it is desired to install a compact heater/blower system in a minimal amount of space.

INDUSTRIAL APPLICABILITY

Work machines, such as a skidloader, must be capable of operation in all types of inclement weather. To this end, attempts are made to make the machine operator as comfortable as possible under the weather conditions in which these machines must be operated. Accordingly, the installation of a small, but highly efficient heater/blower 20 will provide a sufficient output of heated air in an attempt to insure operator comfort under such circumstances as the machine will encounter.

Because of the space constraints in the cockpit or operator's cab of such vehicles, the plenum 24 of the heater/blower 20 has been designed to be directly connected through a transition piece 30 to the hollow pilot control valve shroud 40 in which the pilot control valve is housed. In this manner, the heated air is passed from the plenum 24 through the transition connection 30 directly into the pilot control valve shroud 40. The hollow pilot control valve shroud 40, which normally functions only to protect the pilot control valve, thereby also functions as an air distribution duct to distribute the heated air to selected areas within the operator's cab 10. The positioning of the louvers 46 and 47 carried on the support plate 42, which is secured to the shroud 40 to complete the shroud enclosure, pass the heated air into the machine operator's cab in the direction determined by the positioning of louvers 46 and 47.

While this invention has been described in the specification and illustrated in the drawings with reference to a preferred embodiment, the structure of which has been disclosed herein, it will be understood by those skilled in the art to which this invention pertains that various changes or modifications may be made and equivalents may be substituted for elements of the invention without departing from the scope of the claims. Therefore, it is intended that the invention not be limited to the particular embodiment disclosed in the specification and shown in the drawings as the best mode presently known by the inventors for carrying out this invention, nor confined to the details set forth in the preferred embodiment, but that the invention will include all embodiments, modifications and changes as may come within the scope of the following claims:

What is claimed is:

1. A heating system for use in a work machine comprising:

a heater/blower having a discharge outlet for providing a source of heated air discharged therethrough, an enclosed hollow protective shroud enclosing a portion of a controller for controlling the operation of the work machine, said enclosed hollow protective shroud including a removable access panel for providing access to the interior of said enclosed hollow protective shroud a transition coupling having a first end connected directly to said discharge outlet of said heater/blower and a second end connected directly to said enclosed hollow protective shroud for coupling said heated air from said heater/blower directly to said enclosed hollow protective shroud, a directionally positionable louver carried by said enclosed hollow protective shroud for discharging the heated air passed thereto in a predetermined direction into the operator's compartment, and said directionally positionable louver carried by said removable access panel.

2. The heating system of claim 1 wherein said removable access panel carries at least two directionally positionable louvers to discharge heated air from said enclosed hollow protective shroud in a plurality of directions.

3. The heating system of claim 2 further including a directionally positionable louver carried by said heater/blower plenum for discharging a portion of the air heated by said heater/blower to by-pass said discharge outlet.

4. The heating system of claim 2 further including a temperature controller for selectively varying the temperature of the heated air discharged from said heater/blower.

5. The heating system of claim 4 further including a control switch for controlling the energization of said heater/blower.

* * * * *